United States Patent Office 3,840,596
Patented Oct. 8, 1974

3,840,596
COMPOSITIONS OF MATTER
Sidney B. Richter and Leonard J. Stach, Chicago, Ill., assignors to Velsicol Chemical Corporation, Chicago, Ill.
No Drawing. Application Dec. 23, 1970, Ser. No. 101,191, which is a division of application Ser. No. 782,716, Dec. 10, 1968, now abandoned. Divided and this application Nov. 6, 1972, Ser. No. 304,031
Int. Cl. C07c 119/00
U.S. Cl. 260—545 R
2 Claims

ABSTRACT OF THE DISCLOSURE

This invention discloses new compounds of the formula

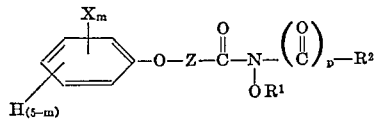

and

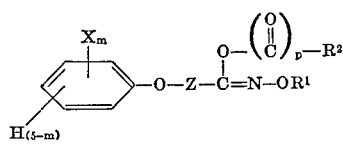

wherein X is selected from the group consisting of alkyl, alkenyl, alkoxy, alkylthio, halogen, nitro, amino, alkylamino, dialkylamino and cyano; m is an integer from 0 to 5; Z is a carbon chain of from 1 to 4 carbon atoms; $R^1$ is alkyl; p is an integer from 0 to 1; and $R^2$ is selected from the group consisting of alkyl, alkenyl, haloalkyl, haloalkenyl, alkoxy, alkylthio, haloalkylthio, alkylamino, dialkylamino and

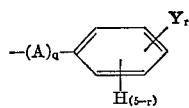

wherein A is selected from the group consisting of oxygen, sulfur and alkylene, q is an integer from 0 to 1, Y is selected from the group consisting of alkyl, alkenyl, alkoxy, alkylthio, halogen, nitro, alkylamino, dialkylamino and cyano, and r is an integer from 0 to 5; provided that when $R^2$ is selected from the group consisting of alkyl, alkenyl, haloalkyl, haloalkenyl, alkylamino and dialkylamino then p is 1, and when A is selected from the group consisting of oxygen and sulfur then p is 1. The compounds of the above description are useful as herbicides and fungicides.

This is a division of application Ser. No. 101,191, filed Dec. 23, 1970, which is a divisional of Ser. No. 782,716, filed Dec. 10, 1968, now abandoned.

This invention relates to new chemical compositions and more particularly relates to compounds of the formula

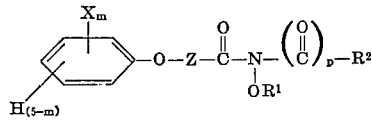

and their isomeric form

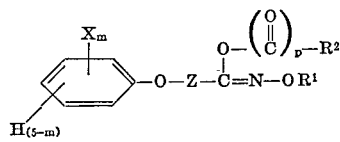

wherein X is selected from the group consisting of alkyl, alkenyl, alkoxy, alkylthio, halogen, nitro, amino, alkylamino, dialkylamino and cyano; m is an integer from 0 to 5; Z is a carbon chain of from 1 to 4 carbon atoms; $R^1$ is alkyl; p is an integer from 0 to 1; and $R^2$ is selected from the group consisting of alkyl, alkenyl, haloalkyl, haloalkenyl, alkoxy, alkylthio, haloalkylthio, alkylamino, dialkylamino and

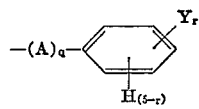

wherein A is selected from the group consisting of oxygen, sulfur and alkylene, q is an integer from 0 to 1, Y is selected from the group consisting of alkyl, alkenyl, alkoxy, alkylthio, halogen, nitro, alkylamino, dialkylamino and cyano, and r is an integer from 0 to 5; provided that when $R^2$ is selected from the group consisting of alkyl, alkenyl, haloalkyl, haloalkenyl, alkylamino and dialkylamino then p is 1, and when A is selected from the group consisting of oxygen and sulfur then p is 1.

In a preferred embodiment of this invention X is selected from the group consisting of lower alkyl, lower alkenyl, lower alkoxy, lower alkylthio, chlorine, bromine, nitro, amino, lower alkylamino, di(lower alkyl)amino and cyano; m is an integer from 0 to 3; $R^1$ is lower alkyl; p is an integer from 0 to 1; and $R^2$ is selected from the group consisting of lower alkyl, lower alkenyl, lower haloalkyl, lower alkoxy, lower alkylthio, lower haloalkylthio, lower alkylamino, di(lower alkyl)amino and

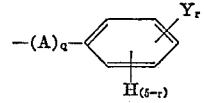

wherein A is selected from the group consisting of oxygen, sulfur and alkylene of up to 3 carbon atoms, q is an integer from 0 to 1, Y is selected from the group consisting of lower alkyl, lower alkenyl, lower alkoxy, lower alkylthio, chlorine, bromine, nitro, lower alkylamino, di(lower alkyl)amino and cyano, and r is an integer from 0 to 3.

The compounds of the present invention are unexpectedly useful as pesticides particularly as herbicides and fungicides.

The compounds of this invention can be prepared readily by reacting a compound of the formula

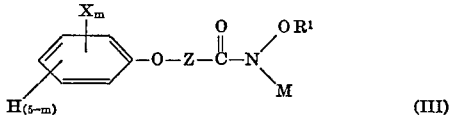 (III)

wherein M is hydrogen or an alkali metal such as sodium or potassium; and X, Z, $R^1$ and m are as heretofore described, with a compound of the formula

 (IV)

wherein $R^2$ and p are as heretofore described. This reaction can be effected in an inert organic reaction medium, such as benzene, carbon tetrachloride or methyl ethyl ketone, by stirring the mixture at a temperature of from about 20° C. to the reflux temperature of the mixture for a period of from about ½ to about 72 hours. Elevated temperatures such as the reflux temperature of the reaction mixture are usually preferred to accelerate the reaction. When compounds of Formula III wherein M is hydrogen are employed, an acid acceptor such as a tertiary amine or an alkali metal hydroxide or carbonate can be utilized to remove the hydrogen halide that is formed. The reaction products can then be recovered by first filtering the reaction mixture to remove the alkali metal chloride or acid acceptor hydrochloride and then evaporating the remaining solution to yield a mixture of the isomeric forms of the compounds of this invention. This mixture of isomers can be used as such for preparing valuable herbicidal and fungicidal compositions or can be separated into the individual isomers.

The separation of the isomeric mixture into its two components can be effected by subjecting the reaction product to chromatography. A suitable adsorbent for this purpose is, for example, fuller's earth, while suitable eluents are pentane and pentane-ether mixtures.

Exemplary compounds of Formula IV suitable for preparing the compounds of the present invention are chloroformates such as methyl chloroformate, ethyl chloroformate, n-propyl chloroformate, isopropyl chloroformate, n-butyl chloroformate, sec-butyl chloroformate, t-butyl chloroformate, pentyl chloroformate, heptyl chloroformate, decyl chloroformate, phenyl chloroformate, 4-chlorophenyl chloroformate, 2,4-dimethylphenyl chloroformate, 2-bromo-4-nitrophenyl chloroformate, 3,5-dimethoxyphenyl chloroformate, 3-dimethylamino chloroformate and 4-cyanophenyl chloroformate; chlorothiolformates such as methyl chlorothioloformate, ethyl chlorothioloformate, phenyl chlorothioloformate, 2,4-dichlorophenyl chlorothioloformate; acid chlorides such as acetyl chloride, propionyl chloride, butanoyl chloride, hexanoyl chloride, chloroacetyl chloride, β-chloropropionyl chloride, trichloroacetyl chloride, bromoacetyl chloride, benzoyl chloride, 2-chloro-4-methylbenzoyl chloride, phenylacetyl chloride, 3-bromo-4-nitrophenylacetyl chloride, 4-chlorophenylacetyl chloride; carbamoyl chlorides such as N-methyl carbamoyl chloride, N-ethylcarbamoyl chloride, N,N-dimethylcarbamoyl chloride, N-isopropylcarbamoyl chloride and N,N-di-n-butylcarbamoyl chloride; and such chlorides as benzyl chloride, 2-chloro-4-methylbenzyl chloride, 2-methoxy-3,6-dichlorobenzyl chloride, 2,4-dinitrobenzyl chloride, methanesulfenyl chloride, ethanesulfenyl chloride, n-propanesulfenyl chloride, n-pentanesulfenyl chloride, chloromethanesulfenyl chloride, dichloromethanesulfenyl chloride, and the like.

The compounds of Formula III wherein M is an alkali metal can be prepared from the corresponding compounds of the general formula

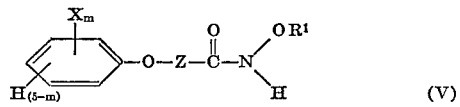

wherein X, $m$, Z and $R^1$ are as heretofore described, by reaction with an alkali metal hydroxide such as potassium hydroxide. This reaction can be readily effected by adding a compound of Formula V to a solution of the alkali metal hydroxide at room temperature with stirring. Stirring can be continued for a period of from about ½ to about 4 hours to ensure the completion of the reaction. The desired product can then be recovered upon evaporation of the solvent.

The compounds of this invention wherein the $R^2$ substituent is alkylamino can also be prepared by reacting a compound of Formula V with an alkyl isocyanate. This reaction can be effected by adding the isocyanate, with stirring, to a solution of the compound of Formula V in an inert organic solvent such as benzene at a temperature of from about room temperature to about the reflux temperature of the reaction mixture. After the addition is completed, stirring and heating are continued for a period of from one to several hours to ensure the completion of the reaction. After this time the desired product can be recovered upon evaporation of the solvent used and can be used as such or can be further purified by procedures common in the art.

The compounds of Formula V can be prepared from an acid halide of the formula

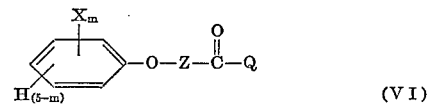

wherein Q is halogen, preferably chlorine or bromine and X, $m$ and Z are as heretofore described, by reaction with about an equimolar amount of an alkoxyamine or alkoxyamine hydrochloride. This reaction can be effected in an inert organic reaction medium in the presence of an acid scavenger such as alkali metal hydroxides and carbonates or tertiary amines.

About equimolar amounts of acid scavenger are employed when the alkoxyamine is used, but at least twice that amount is used for the alkoxyamine hydrochloride. This reaction can be carried out over a wide temperature range such as from room temperature to the reflux temperature of the reaction mixture but elevated temperatures such as from about 50 to 90° C. are preferred. After the reaction is completed the desired product can be recovered from the reaction mixture by common methods in the art such as by filtration of the reaction mixture to remove precipitated salts and distilling the filtrate under reduced pressure to remove unreacted starting materials and solvents.

The acid halides of Formula VI when not readily available can be simply prepared by well known procedures from the corresponding acid such as by reaction with thionyl chloride or phosphorus pentachloride, for example.

Exemplary suitable acids for preparing the acid chlorides of Formula VI are phenoxyacetic acid, 4-chlorophenoxyacetic acid, 2,4 - dichlorophenoxyacetic acid, 2-methyl - 4 -chlorophenoxyacetic acid, 3-methoxyphenoxyacetic acid, 2, 4 - dinitrophenoxyacetic acid, 4-cyanophenoxyacetic acid, 3,4 - dibromophenoxyacetic acid, 2,4-dimethyl - 5 - fluorophenoxyacetic acid, 3-dimethylaminophenoxyacetic acid, 4-isopropylaminophenoxyacetic acid, 3-allyl-4-chlorophenoxyacetic acid, α-(2,4-dichlorophenoxy)-propionic acid, β-(2-methyl-4-chlorophenoxy)-butanoic acid, and the like.

Exemplary suitable alkoxyamine and alkoxyamine hydrochlorides are methoxyamine, methoxyamine hydrochloride, ethoxyamine, ethoxyamine hydrochloride, n-propoxyamine, isopropoxyamine, n-butoxyamine, sec-butoxyamine hydrochloride, t-butoxyamine, decyloxyamine, and the like.

The manner in which the new compounds of the present invention can be prepared readily is more specifically illustrated in the following examples.

EXAMPLE 1

Preparation of the potassium salt of N-methoxy-2-methyl-4-chlorophenoxyacetamide A solution of potassium hydroxide (4.87 grams; 0.087 mol) in absolute ethanol (200 ml.) was charged into a 500 ml. glass reaction flask equipped with mechanical stirrer and N-methoxy-2-methyl-4-chlorophenoxyacetamide (20.0 grams; 0.087 mol) was slowly added thereto, with stirring, over a period of several minutes. After the addition was completed, stirring was continued for a period of about 1 hour. After this time the solution was evaporated on a steam bath under reduced pressure to yield the potassium salt of N-methoxy-2-methyl-4-chlorophenoxyacetamide as the residue.

EXAMPLE 2

Preparation of N-methoxy-N-benzyl - 2-methyl-4-chlorophenoxyacetamide and 1-methoxyimino-1-benzyloxy-2-(2-methyl-4-chlorophenoxy)-ethane The potassium salt of N-methoxy-2-methyl-4-chlorophenoxyacetamide (22.7 grams; 0.084 mol) and methyl ethyl ketone (225 ml.) were charged into a 1 liter threenecked glass reaction flask equipped with a mechanical stirrer, reflux condenser and addition funnel. The mixture was heated to reflux, with stirring, and benzyl chloride (10.13 grams; 0.080 mol) dissolved in methyl ethyl ketone (40 ml.) was added dropwise to the flask. Stirring and refluxing were continued for an additional period of about 72 hours. After this time the reaction mixture was cooled and filtered to remove the potassium chloride which had formed. The filtrate was then evaporated to yield an orange oil. The oil was dissolved in ether and was washed with 30 ml. portions of water. The washed solution was dried over anhydrous magnesium sulfate, filtered and evaporated to yield an orange oil. This oil was dissolved in ether-hexane mixture and was allowed to stand. Upon standing, a precipitate was formed. The precipitate was removed by filtration and the filtrate evaporated to give an oil. This oil was subjected to chromatography utilizing florex as an adsorbent and hexane and hexane-ether mixtures as an eluent to yield the desired products N-methoxy-N-benzyl-2-methyl-4-chlorophenoxy-acetamide as an oil and 1-methoxyimino-1-benzyloxy-2-(2 - methyl - 4-chlorophenoxy)-ethane having a melting point of 64 to 65° C.

EXAMPLE 3

Preparation of N-methoxy-N-(4-chlorobenzyl)-2-methyl-4 - chlorophenoxyacetamide and 1-methoxyimino-1-(4-chlorobenzyloxy) - 2 - (2 - methyl-4-chlorophenoxy)-ethane The potassium salt of N-methoxy-2-methyl-4-chlorophenoxyacetamide (23.1 grams; 0.086 mol), methyl ethyl ketone (200 ml.) and parachlorobenzyl chloride (2.72 grams; 0.079 mol) were charged into a 500 ml. glass reaction flask equipped with mechanical stirrer, thermometer and reflux condenser. The reaction mixture was heated at reflux, with stirring, for a period of about 22 hours. After this time the reaction mixture was cooled and filtered to remove the potassium chloride which had formed. The remaining filtrate was then stripped of solvent to give a red oil. This oil was dissolved in ether-hexane mixture to precipitate unreacted starting materials. The solution was filtered and the filtrate evaporated on a steam bath under reduced pressure to yield an oil. The oil was chromatographed using florex as the adsorbent and pentane and pentane-ether mixtures as the eluent to yield the desired products N-methoxy-N-(4-chlorobenzyl)-2-methyl-4-chlorophenoxyacetamide as an oil and 1-methoxy-imino-1-(4 - chlorobenzyloxy)-2-(2 - methyl-4-chlorophenoxy)-ethane (m.p. 76 to 77° C.).

EXAMPLE 4

Preparation of N-methoxy-N-(2-methylbenzyl)-2-methyl-4 - chlorophenoxyacetamide and 1-methoxyimino-1-(2-methylbenzyloxy) - 2 - (2-methyl-4-chlorophenoxy)-ethane The potassium salt of N-methoxy-2-methyl-4-chlorophenoxyacetamide (26.7 grams) and methyl ethyl ketone (225 ml.) were charged into a 500 ml. glass reaction flask equipped with mechanical stirrer, reflux condenser and addition funnel. The mixture was heated to reflux and α-bromo-o-xylene (14.8 grams; 0.08 mol) was added dropwise, with stirring, to the flask. This mixture was heated at reflux for a period of about 28 hours. After this time the reaction mixture was cooled to room temperature and was filtered to remove the potassium bromide which had formed. The filtrate was stripped of solvent under reduced pressure and the resulting residue was dissolved in benzene. The benzene solution was washed with water, was dried over sodium sulfate and was filtered and evaporated to yield an orange oily residue. The residue was dissolved in ether-hexane mixture and allowed to stand to precipitate unreacted starting material. The solution was then filtered and evaporated on the steam bath to yield an amber oil as the residue. This oil was then chromatographed utilizing florex as the adsorbent and pentane and pentane-ether mixtures as the eluent to yield the desired product N - methoxy - N-(2-methylbenzyl)-2-methyl-4-chlorophenoxyacetamide as an oil and 1-methoxyimino-1-(2 - methylbenzyloxy)-2-(methyl-4-chlorophenoxy)-ethane (m.p. 82 to 83° C.).

EXAMPLE 5

Preparation of N - methoxy - N-(2,4-dichlorobenzyl)-2-methyl - 4-chlorophenoxyacetamide and 1-methoxyimino - 1 - (2,4-dichlorobenzyloxy)-2-(2-methyl-4-chlorophenoxy)-ethane The potassium salt of N-methoxy-2-methyl-4-chlorophenoxyacetamide (24.1 grams; 0.09 mol) and methyl ethyl ketone (230 ml.) were charged into a 500 ml. glass reaction flask equipped with mechanical stirrer, reflux condenser and addition funnel. The mixture was heated to reflux and a solution of 2,4-dichlorobenzyl chloride (15.6 grams; 0.08 mol) in methyl ethyl ketone (30 ml.) was added thereto. The resulting mixture was heated, with stirring, at reflux for a period of about 30 hours. After this time the mixture was cooled to room temperature and filtered to remove the potassium chloride which had formed. The filtrate was stripped of solvent under reduced pressure and the resulting residue was dissolved in a benzene-ether mixture. This solution was washed with water, dried over sodium sulfate and filtered. The filtered solution was then evaporated to yield a red oil. The oil was dissolved in an ether-hexane mixture and was allowed to stand overnight. The solution was then filtered and the filtrate evaporated on a steam bath resulting in a red oil. The oil was then subjected to elution chromatography utilizing florex as the adsorbent and hexane and hexane-ether mixtures as the eluent to yield the desired products N - methoxy - N-(2,4-dichlorobenzyl)-2-methyl-4-chlorophenoxyacetamide as an oil and 1-methoxyimino-1-(2,4-dichlorobenzyloxy) - 2-(2-methyl-4-chlorophenoxy)-ethane (m.p. 86 to 87° C.).

EXAMPLE 6

Preparation of N - methoxy - N-(2,6-dichlorobenzyl)-2-methyl - 4-chlorophenoxyacetamide and 1-methoxyimino - 1 - (2,6-dichlorobenzyloxy)-2-(2-methyl-4-chlorophenoxy)-ethane The potassium salt of N-methoxy-2-methyl-4-chlorophenoxyacetamide (20.24 grams) and methyl ethyl ketone (200 ml.) and 2,6-dichlorobenzyl chloride (13.65 grams; 0.07 mol) were charged into a 500 ml. glass reaction flask equipped with mechanical stirrer and reflux condenser. The reaction mixture was heated at reflux, with stirring, for a period of about 18 hours. After this time the mixture was cooled and filtered to remove the potassium chloride which had formed. The filtrate was stripped of solvent under reduced pressure to yield a solid residue. The residue was dissolved in benzene and the benzene solution washed with water. The washed solution was dried over sodium sulfate, filtered and evaporated to leave a solid residue. The residue was dissolved in a benzene-ether mixture and allowed to stand resulting in a white crystalline solid. This solid was recovered by filtration to yield N-methoxy-N-(2,6-dichlorobenzyl)-2-methyl-4-chlorophenoxyacetamide (m.p. 126 to 127° C.). The remaining filtrate was evaporated under reduced pressure and ether (100 ml.) was added to the residue to produce solidification. The supernatant liquid was evaporated resulting in a residue. This residue was dissolved in an ether-hexane mixture and allowed to stand at room temperature overnight resulting in a formation of a solid. The solution was filtered and the filtrate evaporated to leave a residue which solidified upon standing. This residue was extracted with hexane and the hexane solution was allowed to stand resulting in the formation of the desired product 1 - methoxyimino-1-(2,6-dichlorobenzyloxy) - 1 - (2-methyl-4-chlorophenoxy)-ethane as a white solid (m.p. 93 to 94° C.).

EXAMPLE 7

Preparation of N-methoxy - N - (3,4-dichlorobenzyl)-2-methyl - 4 - chlorophenoxyacetamide and 1-methoxyimino-1-(3,4-dichlorobenzyloxy) - 2 - (2 - methyl-4-chlorophenoxy)-ethane The potassium salt of N - methoxy-2-methyl-4-chlorophenoxyacetamide (24.1 grams; 0.09 mol) and methyl ethyl ketone (225 ml.) were charged into a glass reaction flask equipped with mechanical stirrer, reflux condenser and addition funnel. The mixture was heated and a solution of 3,4-dichlorobenzyl chloride (15.6 grams; 0.08 mol) in methyl ethyl ketone (40 ml.) was slowly added to the flask with continuous stirring and heating. The resulting mixture was heated at reflux for a period of about 45 hours. The mixture was then cooled to room temperature and filtered to remove the potassium chloride which had formed. The filtrate was stripped of solvent under reduced pressure to yield a residue. The residue was dissolved in ether (150 ml.) and was washed with water. The ether solution was then dried over sodium sulfate, filtered and evaporated to yield a red viscous residue. The residue was dissolved in an ether-hexane mixture and allowed to stand resulting in the formation of a white solid. This solid was removed by filtration and the filtrate was stripped of solvents on a steam bath to yield a red residue. This residue was subjected to elution chromatography utilizing florex as the adsorbent and hexane and hexane-ether mixtures as the eluent to yield the desired products N - methoxy-N-(3,4-dichlorobenzyl)-2-methyl-4-chlorophenoxyacetamide as an oil and 1-methoxyimino-1-(3,4-dichlorobenzyloxy)-2-(2-methyl - 4 - chlorophenoxy)-ethane (m.p. 98 to 99° C.).

EXAMPLE 8

Preparation of N-methoxy - N - (4 - methoxybenzyl)-2-methyl - 4 - chlorophenoxyacetamide and 1-methoxyimino-1-(4-methoxybenzyloxy) - 2 - (2-methyl-4-chlorophenoxy)-ethane The potassium salt of N - methoxy-2-methyl-4-chlorophenoxyacetamide (23.1 grams), methyl ethyl ketone (200 ml.) were charged into a 500 ml. glass reaction flask equipped with mechanical stirrer, reflux condenser and addition funnel. The mixture was heated to reflux and paramethoxybenzyl chloride (12.37 grams; 0.079 mol) dissolved in methyl ethyl ketone (40 ml.) was added thereto. The resulting mixture was refluxed for a period of about 18 hours. After this time the mixture was filtered to remove the potassium chloride which had formed. The filtrate was evaporated to yield an oil as a residue. This oil was dissolved in ether and was washed with water. The washed solution was dried over sodium sulfate, was decanted and evaporated to yield an oil. The oil was taken up in an ether-hexane mixture in order to precipitate any unreacted starting materials. The solution was then filtered and evaporated to yield an oil. This oil was subjected to chromatography using florex as the adsorbent and pentane and pentane-ether mixtures as the eluent to yield the desired products N-methoxy-N-(4-methoxybenzyl)-2-methyl-4-chlorophenoxyacetamide as an oil and 1-methoxyimino-1-(4-methoxybenzyloxy) - 2 - (2-methyl-4-chlorophenoxy)-ethane as an oil.

EXAMPLE 9

Preparation of N - methoxy-N-(4-methylbenzyl)-2-methyl - 4 - chlorophenoxyacetamide and 1-methoxyimino-1-(4-methylbenzyloxy) - 2 - (2 - methyl-4-chlorophenoxy)-ethane The potassium salt of N-methoxy-2-methyl-4-chlorophenoxyacetamide (22.7 grams; 0.085 mol) and methyl ethyl ketone (200 ml.) were charged into a glass reaction flask equipped with mechanical stirrer, reflux condenser and addition funnel. The mixture was heated to reflux and α-chloro-p-xylene (11.25 grams; 0.08 mol) dissolved in 40 ml. of methyl ethyl ketone was slowly added with stirring thereto. The resulting mixture was refluxed with continued stirring for a period of about 18 hours. After this time the reaction mixture was cooled and filtered to remove the potassium chloride which had formed. The filtrate was evaporated under reduced pressure to yield an oil. This oil was dissolved in ether and the ether solution was washed with water. The washed solution was dried over sodium sulfate, was filtered and evaporated to yield an oil which solidified upon standing. This solid was recrystallized from hexane to yield N-methoxy-N-(4-methylbenzyl)-2-methyl-4-chlorophenoxyacetamide (m.p. 68 to 69° C.). The mother liquor was evaporated and the residue chromatographed on florex with pentane as the eluent to yield 1 - methoxyimino-1-(4-methylbenzyloxy)-2-(2-methyl-4-chlorophenoxy)-ethane (m.p. 65 to 66° C.) and then additional N - methoxy-N-(4-methylbenzyl)-2-methyl-4-chlorophenoxyacetamide.

EXAMPLE 10

Preparation of N - methoxy-N-phenylcarbonyl-2-methyl-4-chloro-phenoxyacetamide and 1 - methoxyimino - 1-phenylcarbonyloxy-2-(2-methyl - 4 - chlorophenoxy)-ethane N - Methoxy-2-methyl-4-chlorophenoxyacetamide (20 grams; 0.087 mol), pyridine and carbon tetrachloride (200 ml.) were charged into a glass reaction flask equipped with stirrer, reflux condenser and addition funnel. The mixture was heated to reflux and benzoyl chloride (13.49 grams; 0.0957 mol) dissolved in carbon tetrachloride (30 ml.) was slowly added thereto. The reaction mixture was then heated at reflux, with stirring, for a period of about 24 hours. The mixture was then cooled and filtered to remove the pyridine hydrochloride which had formed. The filtrate was stripped of solvent under reduced pressure to yield an orange oil as a residue. The oil was dissolved in ether and washed with aqueous 5% sodium carbonate. The ether solution was washed with water, dried over sodium sulfate, filtered and evaporated on a steam bath to yield a yellow oil. This oil was dissolved in a pentane-ether mixture and was allowed to stand resulting in the formation of a white solid. This solid was removed by filtration and was recrystallized from the ethanol-water mixture to yield N-methoxy-N-phenylcarbonyl - 2 - methyl - 4 - chlorophenoxyacetamide (m.p. 108 to 109° C.). The remaining filtrate was evaporated to yield a yellow oil which was subjected to chromatography utilizing florex as the adsorbent and hexane and hexane-ether mixtures as the eluent to yield additional N - methoxy-N-phenylcarbonyl-2-methyl-4-chlorophenoxyacetamide and 1-methoxyimino-1-phenylcarbonyloxy-2-(2-methyl-4-chlorophenoxy)-ethane as an oil.

EXAMPLE 11

Preparation of 1 - methoxyimino - 1-(2-methoxy-3,6-dichlorophenylcarbonyloxy)-2-(2 - methyl - 4 - chlorophenoxy)-ethane N-Methoxy-2-methyl-4-chlorophenoxyacetamide (11.48 grams; 0.05 mol), pyridine (4.75 grams; 0.06 mol) and carbon tetrachloride (100 ml.) were charged into a 500 ml. glass reaction flask equipped with mechanical stirrer, reflux condenser and addition funnel. The reaction mixture was heated to reflux and 2-methoxy-3,6-dichlorobenzoyl chloride (14.37 grams; 0.06 mol) dissolved in carbon tetrachloride (40 ml.) was slowly added to the reaction flask, with stirring and continued heating. The reaction mixture was heated at reflux for a period of about 28 hours. After this time the reaction mixture was cooled and filtered to remove the pyridine hydrochloride which had formed. The filtrate was washed with aqueous sodium bicarbonate and with water, was dried over magnesium sulfate, filtered and stripped of solvents under reduced pressure to yield an orange oil as a residue. The residue was dissolved in an ether-hexane mixture and allowed to stand resulting in the crystallization of unreacted N-methoxy-2-methyl-4-chlorophenoxyacetamide which was removed by filtration. The resulting filtrate was evaporated to yield an orange oil. The oil was chromatograhed over florex with pentane and ether-pentane mixtures as the eluent to yield the desired product 1-methoxyimino-1-(2-methoxy-3,6-dichlorophenylcarbonyloxy)-2-(2-methyl - 4 - chlorophenoxy)-ethane as an oil.

EXAMPLE 12

Preparation of N-methoxy-N-ethylthiocarbonyl-2-methyl-4-chlorophenoxyacetamide

N-Methoxy-2-methyl-4 - chlorophenoxyacetamide (20.0 grams; 0.087 mol), carbon tetrachloride (200 ml.) and pyridine (7.91 grams; 0.1 mol) were charged into a 1 liter glass reaction flask equipped with mechanical stirrer, reflux condenser and addition funnel. The mixture was heated to reflux and ethyl chlorothioloformate (12.45 grams; 0.1 mol) dissolved in carbon tetrachloride (25 ml.) was slowly added to the mixture with continued stirring and refluxing. The reaction mixture was heated at reflux for a period of about 24 hours. After this time the reaction mixture was cooled to room temperature and was filtered to remove the pyridine hydrochloride which had formed. The filtered reaction mixture was then stripped of solvents under reduced pressure to yield a residue. This residue was fractionally crystallized from carbon tetrachloride to give an initial fraction of unreacted starting material and then fractions of the desired product N-methoxy-N-ethylthiocarbonyl-2 - methyl-4 - chlorophenoxyacetamide (m.p. 86 to 87° C.).

EXAMPLE 13

Preparation of 1-methoxyamino-1-acetyloxy-2-(2-methyl-4-chlorophenoxy)-ethane

N-Methoxy-2-methyl-4 - chlorophenoxyacetamide (20.0 grams; 0.088 mol), dry benzene (200 ml.) and pyridine (8.24 grams; 0.104 mol) were charged into a glass reaction vessel equipped with mechanical stirrer, reflux condenser and addition funnel. The mixture was heated to a temperature of about 78 to 79° C., with stirring, and a solution of acetyl chloride (7.52 grams; 0.096 mol) in dry benzene (20 ml.) was added dropwise to the flask. The reaction mixture was heated at reflux for a period of about 3 hours. After this time the mixture was cooled to room temperature and was allowed to stand. The reaction mixture was then filtered to remove the pyridine hydrochloride which had formed and was stripped of solvent and excess pyridine and acetyl chloride under reduced pressure to yield an oil which solidified when stirred with 70 ml. of hexane. The solid was filtered and recrystallized from an ethanol-water mixture to yield N-methoxy-N-acetyl-2-methyl-4 - chlorophenoxyacetamide. The hexane filtrate was concentrated to yield 1-methoxyimino-1-acetyloxy-2-(2-methyl-4-chlorophenoxy)-ethane which was purified by chromatography over florex.

EXAMPLE 14

Preparation of N-methoxy-N-chloromethylcarbonyl-2-methyl-4-chlorophenoxyacetamide N-Methoxy-2-methyl-4 - chlorophenoxyacetamide (25 grams; 0.109 mol), benzene (200 ml.) and pyridine (11.23 grams; 0.142 mol) were charged into a glass reaction flask equipped with mechanical stirrer, reflux condenser and addition funnel. A solution of chloroacetyl chloride (16.0 grams; 0.142 mol) in benzene (25 ml.) was added dropwise to the flask, with stirring, at a temperature of about 70° C. After the addition was completed the reaction mixture was stirred for an additional period of 2 hours at a temperature of about 78° C. After this time the reaction mixture was cooled and filtered to remove the pyridine hydrochloride which had formed. The filtrate was concentrated to give a semisolid mass. The semisolid mass was washed with water, dried and recrystallized from a benzene-hexane mixture to yield the desired product N-methoxy-N-chloromethylcarbonyl-2-methyl - 4 - chlorophenoxyacetamide having a melting point of 149 to 150° C.

EXAMPLE 15

Preparation of N-methoxy-N-methylaminocarbonyl-2-methyl-4-chlorophenoxyacetamide N-Methoxy-2-methyl-4-chlorophenoxyacetamide (15.0 grams; 0.065 mol) and benzene (100 ml.) were charged into a 300 ml. glass reaction flask equipped with magnetic stirrer and reflux condenser. A few drops of dibutyltin diacetate were then added. The mixture was heated to about 70° C. and methyl isocyanate (4.28 grams; 0.075 mol) dissolved in benzene (60 ml.) was slowly added to the flask over a period of about 15 minutes with continuous stirring. A slight exotherm was observed. After the addition was completed the reaction mixture was heated at reflux for a period of about 90 minutes with continued stirring. After this time the reaction mixture was cooled resulting in the formation of a white crystalline precipitate. This precipitate was recovered by filtration, was washed with hexane to yield the desired product N-methoxy-N-methylaminocarbonyl-2-methyl - 4 - chlorophenoxyacetamide (m.p. 133 to 134° C.).

EXAMPLE 16

Preparation of 1-methoxyimino-1-dimethylaminocarbonyloxy-2-(2-methyl-4-chlorophenoxy)-ethane N - Methoxy-2-methyl-4-chlorophenoxyacetamide (15.0 grams; 0.065 mol), triethylamine (8.08 grams; 0.08 mol) and carbon tetrachloride (175 ml.) were charged into a 500 ml. glass reaction flask equipped with mechanical stirrer, reflux condenser and addition funnel. The mixture was heated to reflux and a solution of dimethylcarbamoyl chloride (7.63 grams; 0.071 mol) in carbon tetrachloride (35 ml.) was slowly added to the flask over a period of 15 minutes with continuous stirring. The reaction mixture was then heated at reflux for a period of about 19 hours with stirring. After this time the reaction mixture was cooled to room temperature and was filtered to remove the triethylamine hydrochloride which had formed. The filtrate was allowed to stand overnight resulting in the formation of a precipitate. An infrared spectrum of this precipitate showed it to be unreacted starting material. This precipitate was removed by filtration and the filtrate was concentrated to yield a residue. The residue was placed under vacuum (0.35 mm.) to remove any unreacted dimethylcarbamoyl chloride and the resulting residue was then subjected to elution chromatography utilizing florex as the adsorbent and hexane as the eluent to yield the desired product 1-methoxyimino-1-dimethylaminocarbonyloxy - 2 - (2 - methyl - 4-chlorophenoxy)-ethane.

EXAMPLE 17

Preparation of 1-methoxyimino-1-ethoxy-2-(2-methyl-4-chlorophenoxy)-ethane

N - Methoxy - 2 - methyl-4-chlorophenoxyacetamide (10 grams; 0.043 mol) dissolved in a 1:1 ether-ethanol mixture (200 ml.) was slowly added to a freshly prepared solution of diazoethane at a temperature of about 0° C. with stirring over a period of about 45 minutes. After the addition was completed, stirring was continued for a period of about 30 minutes while maintaining the temperature of the reaction mixture between about 0 to about 5° C. The reaction mixture was then allowed to warm up to room temperature and was stripped of solvents to yield an oily residue. Hexane (10 ml.) was added to the oil resulting in the formation of a solid. The solid was removed by filtration and the hexane extract was subjected to distillation to yield the desired product 1-methoxyimino - 1 - ethoxy-2-(2-methyl-4-chlorophenoxy)-ethane (b.p. 113 to 115° C. at 0.45 mm. of Hg pressure).

EXAMPLE 18

Preparation of 1-methoxyimino-1-methoxy-2-(2-methyl-4-chlorophenoxy)-ethane

A solution of N - methoxy-2-methyl-4-chlorophenoxy-acetamide (10 grams) in a 1:1 mixture of absolute ether and ethanol (200 ml.) was slowly added to a freshly prepared ether solution of diazomethane at a temperature of about 0° C. The mixture was stirred and was slowly allowed to warm up to room temperature and was allowed to stand for several days. After this time the mixture was stripped of solvents under vacuum on a steam bath to yield a yellow liquid as a residue which solidified upon standing. The solid was extracted with hot pentane and the pentane solution allowed to stand resulting in the formation of a white solid precipitate. This precipitate was recovered by filtration and was dried to yield the desired product 1-methoxyimino-1-methoxy-2-(2-methyl-4-chlorophenoxy)-ethane (m.p. 59 to 61° C.).

EXAMPLE 19

Preparation of N-methoxy-N-trichloromethylthio-2-methyl-4-chlorophenoxyacetamide N - Methoxy - 2 - methyl - 4 - chlorophenoxyacetamide (15.0 grams; 0.065 mol), carbon tetrachloride (175 ml.) and triethylamine (11.83 ml.; 0.085 mol) were charged into a glass reaction flask equipped with mechanical stirrer, reflux condenser and addition funnel. This mixture was heated to a temperature of about 70° C., with stirring, and trichloromethanesulfenyl chloride (12.09 grams; 0.065 mol) dissolved in carbon tetrachloride (60 ml.) was slowly added thereto. A slight exotherm was observed. Heating and stirring of the reaction mixture was continued for a period of about 2 hours resulting in the formation of a white solid precipitate identified as triethylamine hydrochloride. The precipitate was removed by filtration and the resulting filtrate was stripped of solvents to yield a red oil as a residue. The oil was dissolved in a benzene-hexane mixture and was allowed to stand overnight to yield a crystalline solid which was filtered off and dried to yield the desired product N-methoxy-N-trichloromethylthio - 2 - methyl-4-chlorophenoxyacetamide (m.p. 126.5 to 128° C.). The filtrate was placed *in vacuo* to remove the solvent and the resulting red oil dissolved in a minimal amount of ethanol and let stand at room temperature to crystallize an additional amount of the desired product.

Additional compounds within the scope of the present invention can be prepared by the procedures described in the foregoing examples. Presented in the following examples are the essential ingredients required to prepare the indicated named compounds by the procedures heretofore described.

EXAMPLE 20

2 - Methoxy-4-chlorophenoxyacetyl chloride+ethoxyamine+propionyl chloride=N - ethoxy - N-propionyl-2-methoxy - 4 - chlorophenoxyacetamide+1-ethoxyimino-1 - propionyloxy-2-(2-methoxy-4-chlorophenoxy)-ethane.

EXAMPLE 21

2,4-Dibromophenoxyacetyl chloride+isopropoxyamine +n - butanoyl chloride=N-isopropoxy-N-n-butanoyl-2,4-dichlorophenoxyacetamide+1 - isopropoxyimino - 1 - n-butanoyloxy-2-(2,4-dibromophenoxy)-ethane.

EXAMPLE 22

2-Ethyl-4-nitrophenoxyacetyl chloride+n-butoxyamine +bromoacetyl chloride=N - n - butoxy-N-bromoacetyl-2-ethyl - 4 - nitrophenoxyacetamide+1 - n - butoxyimino-1-bromoacetyloxy-2-(2-ethyl-4-nitrophenoxy)-ethane.

EXAMPLE 23

3-Allyl-5-methylthiophenoxyacetyl chloride+n - decyloxyamine+hexanoly chloride=N - n - decyloxy - N - hexanoyl - 3 -allyl - 5 - methylthiophenoxyacetamide+1-n- decyloxyimino - 1 - hexanoyloxy - 2 - (3 - allyl - 5 - methylthiophenoxy)-ethane.

EXAMPLE 24

4 -Methylthiophenoxyacetyl chloride+n - pentyloxyamine+2,4 - dinitrobenzoyl chloride=N - n - pentyloxy-N - (2,4 - dinitrobenzoyl) - 4 - methylthiophenoxyacetamide+1 - n - pentyloxyimino - 1 - (2,4 - dinitrobenzoyloxy-2-(4-methylthiophenoxy)-ethane.

EXAMPLE 25

3 - n - Butyl - 5 - iodophenoxyacetyl ch'oride+ethoxyamine+2 - allyl - 4 - methylaminobenzoyl chloride=N-ethoxy - N - (2 - allyl - 4 - methylaminobenzoyl) - 3 - n - butyl - 5 - iodophenoxyacetamide+1 - ethoxyimino - 1 - (2 - allyl - 4 - methylaminobenzoyloxy) - 2 - (3-n-butyl-5-iodophenoxy)-ethane.

EXAMPLE 26

2 - Dimethylamino - 4 - cyanophenoxyacetyl chloride+ n - octyloxyamine+3 - methylthio - 5 - bromobenzoyl chloride=N - n - octyloxy - N - (3 - methylthio-5-bromobenzoyl) - 2 - dimethylamino - 4-cyanophenoxyacetamide +1 - n - octyloxyimino - 1 - (3 - methylthio - 5 - bromobenzoyloxy) - 2 - (2 - dimethylamino-4-cyanophenoxy)-ethane.

EXAMPLE 27

3 - Ethylamino - 4 - allylphenoxypropionyl chloride+ methoxyamine+pentanoyl chloride=N - methoxy - N - pentanoyl - 3 - ethylamino-4-allylphenoxypropionamide +1 - methoxyimino - 1 - pentanoyloxy - 3 - (3 - ethylamino-4-allylphenoxy)-propane.

EXAMPLE 28

2 - n - Propoxy - 4,5 - dichlorophenoxyacetyl chloride+ methoxyamine+methyl chloroformate=N - methoxy-N-methoxycarbonyl - 2 - n - propoxy - 4,5 - dichlorophenoxyacetamide+1 - methoxyimino - 1 - methoxycarbonyloxy-2-(2-n-propoxy-4,5-dichlorophenoxy)-ethane.

EXAMPLE 29

2 - n - Pentylthio - 4 - di - n - propylaminophenoxyacetyl chloride+methoxyamine+phenyl chloroformate= N - methoxy - N - phenoxycarbonyl - 2 - n - pentylthio-4 - di - n - propylaminophenoxyacetamide+1 - methoxyimino - 1 - phenoxycarbonyloxy - 2 - (2 - n - pentylthio-4-di-n-propylaminophenoxy)-ethane.

EXAMPLE 30

3 - n - Octyloxy - 4 - n - decylphenoxyacetyl chloride+ isopropoxyamine+2,4 - dichlorophenyl chloroformate= N - isopropoxy - N - (2,4 - dichlorophenoxycarbonyl) - 3 - n - octyloxy - 4 - n - decylphenoxyacetamide+1 - isopropoxyimino - 1 - (2,4 - dichlorophenoxycarbonyloxy) - 2 - (3-n-octyloxy-4-n-decylphenoxy)-ethane.

EXAMPLE 31

4 - Fluorophenoxyacetyl chloride+n - heptyloxyamine +2 - methyl - 4 - chlorophenylacetyl chloride=N - n - heptyloxy - N - (2 - methyl - 4 - chlorophenylacetyl) - 4 - fluorophenoxyacetamide+1 - *n* - heptyloxyimino - 1 - (2 - methyl - 4 - chlorophenylacetyloxy) - 2 - (4 - fluorophenoxy)-ethane.

EXAMPLE 32

δ - (3 - Di - n - pentylaminophenoxy)-pentanoyl chloride +methoxyamine+isopropyl chlorothioloformate = N-methoxy - N - isopropylthiocarbonyl - δ - (3 - di - n - pentaylaminophenoxy) - pentanamide+1 - methoxyimino-1 - isopropylthiocarbonyloxy - δ - (3 - di - n - pentylaminophenoxy)-pentane.

Further compounds within the scope of the present invention which can be prepared by the procedures heretofore described are N-methoxy-N-methylthio-2-methyl-4-chlorophenoxyacetamide,
N-methoxy-N-n-propoxycarbonyl-3,4,5-trichlorophenoxyacetamide,
1-methoxyimino-1-n-propoxycarbonyloxy-2-(3,4,5-trichlorophenoxy)-ethane,
N-sec-butoxy-N-chloromethylthiocarbonyl-2-n-butylamino-4-ethoxyphenoxyacetamide,
1-sec-butoxyimino-1-chloromethylthiocarbonyloxy-2-(2-n-butylamino-4-ethoxyphenoxy)-ethane,
N-methoxy-N-ethylaminocarbonyl-2-methyl-4-chlorophenoxyacetamide,
1-methoxyimino-1-ethylaminocarbonyloxy-2-(2-methyl-4-chlorophenoxy)-ethane,
N-ethoxy-N-diethylaminocarbonyl-2-methyl-4-bromophenoxybutyramide,
1-ethoxyimino-1-diethylaminocarbonyloxy-2-(2-methyl-4-bromophenoxy)-butane,
N-methoxy-N-n-propylaminocarbonyl-2,4-dinitrophenoxyactamide,
1-methoxyimino-1-n-propylaminocarbonyloxy-2-(2,4-dinitrophenoxy)-ethane,
N-methoxy-N-n-octylaminocarbonyl-2,6-dimethoxyphenoxyacetamide,
1-methoxyimino-1-*n*-octylaminocarbonyloxy-2-(2,6-dimethoxyphenoxy)-ethane,
N-methoxy-N-di-*n*-pentylaminocarbonyl-4-isopropylthiophenoxyacetamide,
1-methoxyimino-1-di-*n*-pentlyaminocarbonyloxy-2-(4-isopropylthiophenoxy)-ethane,
N-methoxy-N-acryloyl-2-methyl-4-chlorophenoxyacetamide,
1-methoxyimino-1-acryloyloxy-2-(2-methyl-4-chlorophenoxy)-ethane,
N-methoxy-N-crotonyl-2-methyl-4-chlorophenoxyacetamide,
1-methoxyimino-1-crotonyloxy-2-(2-methyl-4-chlorophenoxy)-ethane,
N-methoxy-N-(2-isopropylbenzoyl)-3-isopropylaminophenoxyacetamide,
1-methoxyimino-1-(2-isopropylbenzoyloxy)-2-(3-isopropylaminophenoxy)-ethane,
N-n-pentyloxy-N-(2-n-decyl-4-n-propoxybenzoyl)-4-chlorophenoxyacetamide,
1-n-pentyloxyimino-1-(2-n-decyl-4-n-propoxybenzoyloxy)-2-(4-chlorophenoxy)-ethane,
N-n-hexyloxy-N-(2-n-propylthio-4-iodobenzoyl)-4-bromophenoxyacetamide,
1-n-hexyloxyimino-1-(2-n-propylthio-4-iodobenzoyloxy)-2-(4-bromophenoxy)-ethane,
N-methoxy-N-(3-cyanobenzylcarbonyl)-3,4-dichlorophenoxyacetamide,
1-methoxyimino-1-(3-cyanobenzylcarbonyloxy)-2-(3,4-dichlorophenoxy)-ethane,
N-methoxy-N-(4-chlorophenethylcarbonyl)-2-methyl-4-diethylaminophenoxyacetamide,
1-methoxyamino-1-(4-chlorophenethylcarbonyloxy)-2-(2-methyl-4-dimethylaminophenoxy)-ethane,
N-methyl-N-(4-dimethylaminobenzyl)-2-ethyl-4,5-dichlorophenoxyacetamide,
1-methoxyimino-1-(4-dimethylaminobenzyloxy)-2-(2-ethyl-4,5-dichlorophenoxy)-ethane,
and the like.

For practical use as herbicides or fungicides, the compounds of this invention are generally incorporated into herbicidal or fungicidal compositions which comprise an inert carrier and a herbicidally or fungicidally toxic amount of such a compound. Such herbicidal or fungicidal compositions, which can also be called formulations, enable the active compound to be applied conventiently to the site of the weed or fungi infestation in any desired quantity. These compositions can be solids such as dusts, granules or wettable powders; or they can be liquids such as solutions, aerosols or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water or oil to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of herbicides or fungicides can be dispersed under superatmospheric pressure as aerosols. However, preferred liquid herbicidal or fungicidal compositions are emulsifiable concentrates, which comprise an active compound according to this invention and as the inert carrier, a solvent and an emulsifier. Such emulsifiable concentrates can be extended with water and/or oil to any desired concentration of active compound for application as sprays to the site of the weed or fungus infestation. The emulsifiers most commonly used in these concentrates are nonionic or mixtures of nonionic with anionic surface-active agents. With the use of some emulsifier systems an inverted emulsion (water in oil) can be prepared for direct application to weed or fungus infestations.

A typical herbicidal or fungicidal composition according to this invention is illustrated by the following example, in which the quantities are in parts by weight.

EXAMPLE 33

Preparation of a dust

Product of Example 2 _____ 10
Powdered talc _____ 90

The above ingredients are mixed in a mechanical grinder-blender and are ground until a homogeneous, free-flowing dust of the desired particle size is obtained. This dust is suitable for direct application to the site of the weed or fungus infestation.

The compounds of this invention can be applied as herbicides or fungicides in any maner recognized by the art. One method for the control of weeds or fungi comprises contacting the locus of said weeds or fungi with a herbicidal or fungicidal composition comprising an inert carrier and, as an essential active ingredient, in a quantity which is herbicidally or fungicidally toxic to said weeds or fungi, a compound of the present invention. The concentration of the new compounds of this invention in the herbicidal or fungicidal compositions will vary greatly with the type of formulation and the purpose for which it is designed, but generally the herbicidal or fungicidal compositions will comprise from about 0.05 to about 95 percent by weight of the active compounds of this invention. In a preferred embodiment of this invention. the herbicidal or fungicidal compositions will comprise from about 5 to about 75 percent by weight of the active compound. The compositions can also comprise such additional substances as other pesticides, such as insecticides, nematocides, fungicides, and the like; stabilizers, spreaders, deactivators, adhesives, stickers, fertilizers, activators, synergists, and the like.

The compounds of the present invention are also useful when combined with other herbicides and/or defoliants, desiccants, growth inhibitors, and the like in the herbicidal compositions heretofore described. These other materials can comprise from about 5% to about 95% of the active ingredients in the compositions. Use of combinations of these other herbicides and/or defoliants, desiccants, etc. with the compounds of the present invention provide herbicidal compositions which are more effective in controlling weeds and often provide results unattainable with separate compositions of the individual herbicides. The other herbicides, defoliants, desiccants and plant growth inhibitors, with which the compounds of this invention can be used in the herbicidal compositions to control weeds, can include chlorophenoxy herbicides such as 2,4-D, 2,4,5-T, MCPA, MCPB, 4(2,4-DB), 2,4-DEB, 4-CPB, 4-CPA 4-CPP 2,4,5-TB, 2,4,5-TES, 3,4-DA, silvex, and the like; carbamate herbicides such as IPC CIPC, swep, barban, BCPC, CEPC, CPPC, and the like; thiocarbamate and dithiocarbamate herbicides such as CDEC, metham sodium, EPTC, diallate, PEBC, perbulate, vernolate, and the like; substituted urea herbicides such as norea, siduron, dichloral urea, chloroxuron, cycluron, fenuron, monuron, monuron TCA, diuron, linuron, monolinuron, neburon, buturon, trimeturon, and the like; symmetrical triazine herbicides such as simazine, chlorazine, atratone, desmetryne, norazine, ipazine, prometryn, atrazine, trietazine, simetone, prometone, propazine, ametryne, and the like; chloroacetamide herbicides, such as alpha-chloro - N,N - dimethylacetamide CDEA, CDAA, alpha-chloro-N-isopropylacetamide, 2-chloro-N-isopropylacetanilide, 4 - (chloroacetyl)morpholine, 1 - (chloroacetyl)piperidine, and the like; chlorinated aliphatic acid herbicides such as TCA, dalapon, 2,3-di-chloropropionic acid, 2,2,3-TPA, and the like; chlorinated benzoic acid and phenylacetic acid herbicides such as 2,3,6-TBA, 2,3,5,6-TBA, dicamba, tricamba, amiben, fenac, PBA, 2-methoxy-3,6-dichlorophenylacetic acid, 3-methoxy - 2,6 - dichlorophenylacetic acid, 2-methoxy-3,5,6-trichlorophenylacetic acid, 2,4 - dichloro-3-nitrobenzoic acid, and the like; and such compounds as aminotriazole, maleic hydrazide, phenyl mercuric acetate, endothal, biuret, technical chlordane, dimethyl 2,3,5,6-tetrachloroterephthalate, diquat, erbon, DNC, DNBP, dichlobenil, DPA, diphenamid, dipropalin, trifluralin, solan, dicryl, merphos, DMPA, O-S-dimethyl tetrachlorothioterephthalate, methyl 2,3,5,6 - tetrachloro-N-methoxy-N-methylterephthalamate, 2 - [(4 - chloro-o-tolyl)-oxyl-N-methoxyacetamide, DSMA, MSMA, potassium azide, acrolein, benefin, bensulide, AMS, bromacil, bromoxynil, cacodylic acid, CMA, CPMF, cypromid, DCB, DCPA, dichlone, diphenatril, DMTT, DNAP, EBEP, EXD, HCA, ioxynil, IPX, isocil, potassium cyanate, MAA, MAMA, MCPES, MCPP, MH, molinate, NPA, OCH, paraquat, PCP, picloram, DPA, PCA, pyrichlor, sesone, terbacil, terbutol, TCBA, brominil, CP-50144, H-176-1, H-732, M-2901, planavin, sodium tetraborate, calcium cyanamid, DEF, ethyl xanthogen disulfide, sindone, sindone B, propanil, and the like.

Such herbicides can also be used in the methods and compositions of this invention in the form of their salts, esters, amides and other derivatives whenever applicable to the particular parent compounds.

Weeds are undesirable plants growing where they are not wanted, having no economic value, and interfering with the production of cultivated crops, with the growing of ornamental plants, or with the welfare of livestock. Many types of weeds are known, including annuals such as pigweed, lambsquarters, foxtail, crabgrass, wild mustard, field pennycress, ryegrass, goose-grass, chickweed, wild oats, velvet leaf, purselane, barnyard grass, smartweed, knotweed, cocklebur, wild buckwheat, kochia, medic, corn cockle, ragweed, sowthistle, coffee-weed, croton, cuphea, dodder, fumitory, groundsel, hemp nettle, knowel, spurge, spurry, emex, jungle rice, pondweed, dog fennel, carpetweed, morning glory, bedstraw, ducksalad and naiad; biennials such as wild carrot, matricaria, wild barley, campion, chamomile, burdock, mullein, round-leaved mallow, bull thistle, hounds-tongue, moth mullein and purple star thistle; or perennials such as white cockle, perennial rye-grass, quackgrass, Johnson grass, Canada thistle, hedge bindweed, Bermuda grass, sheep sorrel, curly dock, nutgrass, field chickweed, dandelion, campanula, field bindweed, Russian knapweed, mesquite, toadflax, yarrow, aster, gromwell, horsetail, ironweed, sesbania, bulrush, cattail and wintercress.

Similarly, such weeds can be classified as broadleaf or grassy weeds. It is economically desirable to control the growth of such weeds without damaging beneficial plants or livestock.

The new compounds of this invention are particularly valuable for weed control because they are toxic to many species and groups of weeds while they are relatively non-toxic to many beneficial plants. Thhe exact amount of compound required will depende on a variety of factors, including the hardiness of the particular weed species, weather, type of soil, method of application, the kind of beneficial plants in the same area, and the like. Thus, while the application of up to only about one or two ounces of active compound per acre may be sufficient for good control of a light infestation of weeds growing under adverse conditions, the application of ten pounds or more of active compound per acrea may be required for good control of a dense infestation of hardy perennial weeds growing under favorable conditions.

The herbicidal toxicity of the new compounds of this invention can be illustrated by many of the established testing techniques known to the art, such as pre- and post-emergence testing.

The herbicidal activity of the compounds of this invention was demonstrated by experiments carried out for the pre-emergence control of a variety of weed species. In these experiments small plastic greenhouse pots filled with dry soil were seeded with the various seeds. Twenty-four hours or less after seeding the pots were sprayed with water until the soil was wet and the test compounds formulated as aqueous emulsions of acetone solutions containing emulsifiers were sprayed at the indicated concentrations on the surface of the soil.

After spraying, the soil containers were placed in the greenhouse and provided with supplementary heat as required and daily or more frequent watering. The plants were maintained under these conditions for a period of from 15 to 21 days, at which time the condition of the plants and the degree of injury to the plants was rated on a scale of from 0 to 10, as follows: 0=no injury, 1,2 =slight injury, 3,4=moderate injury, 5,6=moderately severe injury, 7,8,9=severe injury and 10=death. The effectiveness of these compounds is demonstrated by the following data:

TABLE I.—CONTROL OF BARNYARD GRASS

| Test compound | Concentration of test compound in lbs./acre | Injury rating |
|---|---|---|
| N-methoxy-N-(2-methylbenzyl)-2-methyl-4-chlorophenoxyacetamide | 8 | 9 |
| N-methoxy-N-(4-methyloxybenzyl)-2-methyl-4-chlorophenoxyacetamide | 8 | 9 |
| Do | 4 | 7 |
| N-methoxy-N-benzoyl-2-methyl-4-chlorophenoxyacetamide | 8 | 9 |
| Do | 4 | 9 |
| Do | 2 | 8 |
| 1-methoxyimino-1-benzoyloxy-2-(2-methyl-4-chlorophenoxy)-ethane | 8 | 8 |
| Do | 4 | 7 |
| N-methoxy-N-methylaminocarbonyl-2-methyl-4 chlorophenoxyacetamide | 8 | 9.5 |
| Do | 4 | 9 |
| 1-methoxyimino-1-dimethylaminocarbonyloxy-2-(2-methyl-4-chlorophenoxy)-ethane | 8 | 7 |
| 1-methoxyimino-1-methoxy-2-(2-methyl-4-chlorophenoxy)-ethane | 8 | 8 |
| 1-methoxyimino-1-(2-methoxy-3,6-dichlorobenzoyloxy)-2-(2-methyl-4-chlorophenoxy)-ethane | 8 | 8 |
| N-methoxy-N-ethylthiocarbonyl-2-methyl-4-chlorophenoxyacetamide | 8 | 8 |
| Do | 4 | 7 |
| N-methoxy-N-chloromethylcarbonyl-2-methyl-4-chlorophenoxyacetamide | 8 | 7 |
| 1-methoxyimino-1-acetyloxy-2-(2-methyl-4-chlorophenoxy)-ethane | 8 | 9.5 |
| Do | 4 | 9 |
| Do | 2 | 7 |

TABLE II.—CONTROL OF COFFEE WEED

| Test compound | Concentration of test compound in lbs./acre | Injury rating |
|---|---|---|
| N-methoxy-N-benzyl-2-methyl-4-chlorophenoxyacetamide | 4 | 9 |
| Do | 2 | 7 |
| N-methoxy-N-(4-chlorobenzyl)-2-methyl-4-chlorophenoxyacetamide | 8 | 7 |
| N-methoxy-N-(2-methylbenzyl)-2-methyl-4-chlorophenoxyacetamide | 8 | 7 |
| N-methoxy-N-(4-methoxybenzyl)-2-methyl-4-chlorophenoxyacetamide | 8 | 8 |
| 1,methoxyimino-1-(2,6-dichlorobenzyloxy)-2-(2-methyl-4-chlorophenoxy)-ethane | 8 | 9 |
| N-methoxy-N-benzoyl-2-methyl-4-chlorophenoxyacetamide | 8 | 10 |
| Do | 4 | 10 |
| Do | 2 | 10 |
| 1-methoxyimino-1-benzoyloxy-2-(2-methyl-4-chlorophenoxy)-ethane | 8 | 10 |
| Do | 2 | 10 |
| 1-methoxyimino-1-dimethylaminocarbonyloxy-2-(2-methyl-4-chlorophenoxy)-ethane | 8 | 10 |
| Do | 4 | 9 |
| N-methoxy-N-trichloromethylthio-2-methyl-4-chlorophenoxyacetamide | 4 | 10 |
| N-methoxy-N-ethylthiocarbonyl-2-methyl-4-chlorophenoxyacetamide | 8 | 10 |
| Do | 4 | 10 |

TABLE III.—CONTROL OF CRABGRASS

| Test compound | Concentration of test compound in lbs./acre | Injury rating |
|---|---|---|
| N-methoxy-N-benzyl-2-methyl-4-chlorophenoxyacetamide | 8 | 10 |
| Do | 4 | 10 |
| Do | 2 | 9 |
| Do | 1 | 7 |
| 1-methoxyimino-1-benzyloxy-2-(2-methyl-4-chlorophenoxy)-ethane | 8 | 7 |
| N-methoxy-N-(4-chlorobenzyl)-2-methyl-4-chlorophenoxyacetamide | 8 | 9 |
| Do | 4 | 8 |
| N-methoxy-N-(2-methylbenzyl)-2-methyl-4-chlorophenoxyacetamide | 8 | 8 |
| Do | 4 | 7 |
| 1-methoxyimino-1-(2-methylbenzyloxy)-2-(2-methyl-4-chlorophenoxy)-ethane | 8 | 7 |
| N-methoxy-N-(4-methoxybenzyl)-2-methyl-4-chlorophenoxyacetamide | 8 | 10 |
| Do | 4 | 8 |
| Do | 2 | 9 |
| N-methoxy-N-(benzoyl)-2-methyl-4-chlorophenoxyacetamide | 8 | 10 |
| Do | 4 | 9 |
| Do | 2 | 9 |
| 1-methoxyimino-1-benzoyloxy-2-(2-methyl-4-chlorophenoxy)-ethane | 8 | 10 |
| Do | 4 | 9 |
| Do | 2 | 7 |
| N-methoxy-N-methylaminocarbonyl-2-methyl-4-chlorophenoxyacetamide | 8 | 10 |
| Do | 4 | 9.5 |
| Do | 2 | 9 |
| 1-methoxyimino-1-dimethylaminocarbonyloxy-2-(2-methyl-4-chlorophenoxy)-ethane | 8 | 9 |
| Do | 4 | 9 |
| N-methoxy-N-ethylthiocarbonyl-2-methyl-4-chlorophenoxyacetamide | 8 | 9 |
| Do | 4 | 9 |
| Do | 2 | 7 |
| N-methoxy-N-chloromethylcarbonyl-2-methyl-4-chlorophenoxyacetamide | 8 | 9 |
| Do | 4 | 9 |
| Do | 2 | 9 |
| Do | 1 | 8 |
| 1-methoxyimino-1-acetyloxy-2-(2-methyl-4-chlorophenoxy)-ethane | 8 | 10 |
| Do | 4 | 9 |
| Do | 2 | 9.5 |
| Do | 1 | 9 |
| Do | ½ | 7 |

The herbicidal activity of the compounds of this invention was also demonstrated by experiments carried out for the post-emergence control of various weeds. In these experiments the compounds to be tested were formulated as aqueous emulsions and sprayed at the indicated dosage on the foliage of the weed plants that have attained a prescribed size. After spraying the plants were placed in a greenhouse and watered daily or more frequently. Water was not applied to the foliage of the treated plants. The severity of the injury was determined 10 to 15 days after treatment and was rated on the scale of from 0 to 10 heretofore described. The effectiveness of these compounds is demonstrated by the following data:

TABLE IV.—CONTROL OF CURLY DOCK

| Test compound | Concentration of test compound in lbs./acre | Injury rating |
|---|---|---|
| N-methoxy-N-benzyl-2-methyl-4-chlorophenoxyacetamide | 8 | 10 |
| Do | 4 | 10 |
| Do | 2 | 10 |
| Do | 1 | 9 |
| N-methoxy-N-(4-chlorobenzyl)-2-methyl-4-chlorophenoxyacetamide | 8 | 10 |
| Do | 4 | 9 |
| N-methoxy-N-(2-methylbenzyl)-2-methyl-4-chlorophenoxyacetamide | 8 | 10 |
| Do | 4 | 10 |
| Do | 2 | 7 |
| N-methoxy-N-(4-methoxybenzyl)-2-methyl-4-chlorophenoxyacetamide | 8 | 9 |
| Do | 4 | 9 |
| N-methoxy-N-benzoyl-2-methyl-4-chlorophenoxyacetamide | 8 | 10 |
| Do | 4 | 10 |
| Do | 2 | 9 |
| Do | 1 | 9 |
| 1-methoxyimino-1-benzoyloxy-2-(2-methyl-4-chlorophenoxy)-ethane | 8 | 10 |
| Do | 4 | 10 |
| Do | 2 | 9 |
| Do | 1 | 9 |
| N-methoxy-N-methylaminocarbonyl-2-methyl-4-chlorophenoxyacetamide | 8 | 9 |
| Do | 4 | 7 |
| Do | 2 | 8 |
| 1-methoxyimino-1-dimethylaminocarbonyloxy-2-(2-methyl-4-chlorophenoxy)-ethane | 8 | 9 |
| Do | 4 | 8 |
| Do | 2 | 8 |
| 1-methoxyimino-1-ethoxy-2-(2-methyl-4-chlorophenoxy)-ethane | 8 | 10 |
| Do | 4 | 9 |
| Do | 2 | 8 |
| N-methoxy-N-trichloromethylthio-2-methyl-4-chlorophenoxyacetamide | 4 | 10 |
| Do | 2 | 10 |
| Do | 1 | 10 |
| Do | ½ | 10 |
| 1-methoxyimino-1-(2-methoxy-3,6-dichlorobenzoyloxy)-2-(2-methyl-4-chlorophenoxy)-ethane | 8 | 9 |
| Do | 4 | 9 |
| Do | 2 | 7 |
| Do | 1 | 7 |
| N-methoxy-N-ethylthiocarbonyl-2-methyl-4-chlorophenoxyacetamide | 8 | 10 |
| Do | 4 | 9 |
| Do | 2 | 8 |

The new compounds of this invention are fungicidal in their ability to kill, inhibit or inactivate a fungus so that it does not grow. Practically, these compounds can be used to prevent fungi and molds from harming cloth, wood, plants, seeds, fruit, animals or whatever else they attack. The fungicidal compounds should preferably be applied before the infection has occurred and certainly before it has progressed very far.

When the compounds of this invention are used as agricultural fungicides, they can be applied to plant foliage, to seeds, to the soil, or to such parts of plants as the fruits themselves. Plants are susceptible to a great many diseases which cause widespread damage; and among some of the more important which can be mentioned are late blight on tomato, powdery mildew on cucumber (*Erysiphe cichoracearum*), cereal leaf rust on wheat (*Puccinia rubigo-vera*), and such common soil fungi as fusarium wilt (*Fusarium oxysporum*), the seed rot fungus (*Phythium debaryanum*), and the sheath and culm blight (*Rhizoctonia solani*).

The new compounds of this invention can also be employed as industrial fungicides to control a variety of fungi which attack such materials as adhesives, cork, paints, lacquers, leather, wood, plastics and textiles, such as cotton and wool.

The quantity of active compound of this invention to be used for good disease control will depend on a variety of factors, such as the particular disease involved, the intensity of the infestation, formulation, weather, type of crop, and the like. Thus, while the application of only one or two ounces of active compound per acre of a crop may be sufficient to control a light infestation of certain fungi, a pound or more of active compound per acre may be required to control a heavy infestation of a hardy species of fungus.

The compounds of the present invention are also useful when combined with other fungicides in the fungicidal compositions heretofore described. The other fungicides can comprise from about 5 percent to about 95 percent of the active ingredients in the fungicidal compositions. Use of combinations of these other fungicides with the compounds of the present invention provides fungicidal compositions which are more effective in controlling fungi and often provide results unattainable with separate compositions of the individual fungicides. The other fungicides, with which the compounds of this invention can be used in the fungicidal compositions to control fungi, can include fungicides such as 2-aminobutane, bordeaux mixture, ammonium dimethyl dithiocarbamate, benzoyl trimethyl ammonium bromide, cadmium sulfate, captan, chloranil, copper sulfate, cycloheximide, dichlone, 2,4-dichloro-6-(2-chloroanilino)-s-triazine, DDT, dichloran, p-dimethylaminobenzenediazo sodium sulfonate, dinocap, diphenylmercuri 8-hydroxyquinolinate, didine, ethylmercuric chloride, ferbam, folpet, gliodin, maneb, metham, mezineb, nabam, pentachloronitrobenzene, PMA, phenylmercuric urea, streptomicin, thiram, zineb, ziram, difolatan, PCNB, and the like.

Such fungicides can also be used in the methods and compositions of this invention in the form of their esters, amides and other derivatives whenever applicable to the particular parent compounds.

The fungicidal utility of the compounds of this invention was demonstrated by experiments carried out for the control of fungi. In a typical experiment the test compounds were formulated as aqueous emulsions of acetone solutions at various concentrations. Five day old Henry wheat plants contained in 4-inch plastic pots were watered with 100 ml. of the test formulation. After five days the plants were inoculated by shaking a 9 to 13 day old leaf rust of wheat culture (*Puccinia rubigo-vera*) over the foliage of the plants. After the inoculation the plants were placed in a moist chamber overnight and then into a greenhouse. After a period of 9 to 10 days the extent of the disease is determined by counting the number of sori on the leaves of the plants and rating them on a percent basis in comparison to untreated controls. The results of this experiment are given in the following table.

TABLE V.—SYSTEMIC CONTROL OF LEAF RUST OF WHEAT

| Test compound | Concentration of test compound in lbs./acre | Percent control |
|---|---|---|
| 1-methoxyimino-1-(4-chlorobenzyloxy)-2-(2-methyl-4-chlorophenoxy)-ethane | 40 | 95 |
| N-methoxy-N-(2-methylbenzyl)-2-methyl-4-chlorophenoxyacetamide | 40 | 70 |
| 1-methoxyimino-1-(2-methylbenzyloxy)-2-(2-methyl-4-chlorophenoxy)-ethane | 40 | 80 |
| N-methoxy-N-(2,4-dichlorobenzyl)-2-methyl-4-chlorophenoxyacetamide | 40 | 90 |
| N-methoxy-N-(4-methylbenzyl)-2-methyl-4-chlorophenoxyacetamide | 40 | 80 |
| 1-methoxyimino-1-benzoyloxy-2-(2-methyl-4-chlorophenoxy)-ethane | 16 | 98 |
| Do | 6.4 | 85 |
| N-methoxy-N-chloromethylcarbonyl-2-methyl-4-chlorophenoxyacetamide | 40 | 90 |
| Do | 16 | 90 |
| 1-methoxyimino-1-acetyloxy-2-(2-methyl-4-chlorophenoxy)-ethane | 40 | 90 |
| Do | 16 | 85 |
| N-methoxy-N-methylaminocarbonyl-2-methyl-4-chlorophenoxyacetamide | 40 | 90 |

In another experiment wherein the activity of the compounds of this invention as protectants against helminthosporium blight of wheat was determined, 5 to 8 day old Cheyenne wheat plants contained in 5-inch pots were sprayed with the test compound formulated as aqueous emulsions of acetone solutions. After the plants had dried they were inoculated with *Helminthosporium sativum* spores. The wheat plants were then placed in a humidity chamber for a period of 48 hours and thereafter into a greenhouse where they were supplied with water and light as required for a period of about 2 days. After this time the extent of the disease on the leaves of the treated plants was determined and rated on a percent basis in comparison to untreated controls. Results of this experiment are as follows:

TABLE VI.—CONTROL OF HELMINTHOSPORIUM BLIGHT OF WHEAT

| Test compound | Concentration of test compound in p.p.m. | Percent control |
|---|---|---|
| N-methoxy-N-trichloromethylthio-2-methyl-4-chlorophenoxyacetamide | 1,000 | 95 |
| 1-methoxyimino-1-(2,6-dichlorobenzyloxy)-2-(2-methyl-4-chlorophenoxy)-ethane | 1,000 | 96 |
| Do | 400 | 92.5 |
| Do | 100 | 70 |

We claim:
1. A compound of the formula

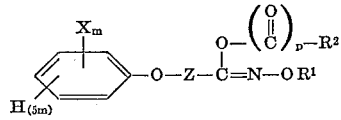

wherein X is selected from the group consisting of lower alkyl, lower alkenyl, lower alkoxy, lower alkylthio, halogen, nitro, amino, lower alkylamino, di(lower alkyl)amino and cyano; $n$ is an integer from 0 to 5; Z is a carbon chain of from 1 to 4 carbon atoms; $R^1$ is lower alkyl; $p$ is 1; and $R^2$

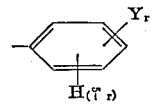

wherein Y is selected from the group consisting of lower alkyl, lower alkenyl, lower alkoxy, lower alkylthio, halogen, nitro, amino, lower alkylamino, di(loweralkyl)amino and cyano and $r$ is an integer from 0 to 5.

2. The compound of claim 1, 1-methoxyimino-1-phenylcarbonyloxy-2-(2-methyl-4-chlorophenoxy)-ethane.

References Cited

UNITED STATES PATENTS 3,371,106  2/1968  Berliner et al. _____ 260—453
3,649,604  3/1972  Richter et al. _____ 260—453

ROBERT GERSTL, Primary Examiner

U.S. Cl. X.R.

260—453 R, 455 A, 455 B, 455 R, 465 D, 465 F; 424—298, 300, 301, 307, 315